(12) United States Patent
Mineta et al.

(10) Patent No.: US 8,583,367 B2
(45) Date of Patent: Nov. 12, 2013

(54) SYSTEM AND METHOD FOR DISPLAYING A ROUTE BASED ON A VEHICLE STATE

(75) Inventors: Kenichi Mineta, Rancho Palos Verdes, CA (US); Maja Kurciska, Sherman Oaks, CA (US); Lisa Umeda, Glendale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 12/986,360

(22) Filed: Jan. 7, 2011

(65) Prior Publication Data

US 2012/0179361 A1   Jul. 12, 2012

(51) Int. Cl.
*G01C 21/00* (2006.01)

(52) U.S. Cl.
USPC ......... 701/457; 701/432; 701/425; 340/539.2

(58) Field of Classification Search
USPC ................. 701/457, 200, 201, 208, 425, 432; 340/539.2
See application file for complete search history.

(56) References Cited

U.S. PATENT DOCUMENTS

| | | |
|---|---|---|
| 5,220,507 A | 6/1993 | Kirson |
| 5,638,280 A | 6/1997 | Nishimura et al. |
| 5,742,922 A | 4/1998 | Kim |
| 6,278,939 B1 | 8/2001 | Robare et al. |
| 6,292,745 B1 | 9/2001 | Robare et al. |
| 6,317,685 B1 | 11/2001 | Kozak et al. |
| 6,351,708 B1 | 2/2002 | Takagi et al. |
| 6,680,694 B1 | 1/2004 | Knockeart et al. |
| 6,687,615 B1 | 2/2004 | Krull et al. |
| 6,728,607 B1 | 4/2004 | Anderson |
| 6,741,931 B1 | 5/2004 | Kohut et al. |
| 6,915,207 B2 | 7/2005 | Nakano |
| 6,968,272 B2 | 11/2005 | Knockeart et al. |
| 7,050,905 B2 | 5/2006 | Nemeth |
| 7,120,539 B2 | 10/2006 | Krull et al. |
| 7,124,023 B2 | 10/2006 | Peeters |
| 7,167,795 B2 | 1/2007 | Hirose et al. |
| 7,184,886 B1 | 2/2007 | Krull et al. |
| 7,289,904 B2 | 10/2007 | Uyeki |
| 7,317,986 B2 | 1/2008 | Kim |
| 7,342,516 B2 | 3/2008 | Kato et al. |
| 7,376,509 B2 | 5/2008 | Endo et al. |
| 7,451,040 B2 | 11/2008 | Miyahara |
| 7,493,214 B2 | 2/2009 | Jung et al. |
| 7,512,489 B2 | 3/2009 | Endo et al. |

(Continued)

FOREIGN PATENT DOCUMENTS

| | | | |
|---|---|---|---|
| JP | 02278116 A | * 11/1990 | |
| JP | 2278116 A | * 11/1990 | ............. G01C 21/00 |

(Continued)

OTHER PUBLICATIONS

International Search Report and Written Opinion mailed Apr. 30, 2012 in PCT Application No. PCT/US2012/020048.

*Primary Examiner* — Fadey Jabr
*Assistant Examiner* — Basil T Jos
(74) *Attorney, Agent, or Firm* — Plumsea Law Group, LLC

(57) ABSTRACT

A user selects route preferences related to weighing or considering different factors when determining a requested candidate route to a destination and chooses a candidate route ranking. A motor vehicle detects a condition associated with a vehicle state. The motor vehicle displays the candidate route based on the detected vehicle condition in a preselected order determined by the route ranking.

26 Claims, 10 Drawing Sheets

(56) References Cited

U.S. PATENT DOCUMENTS

| | | |
|---|---|---|
| 7,532,980 B2 | 5/2009 | Suzuki |
| 7,853,403 B2 * | 12/2010 | Tanaka .......................... 701/414 |
| 2002/0128773 A1 | 9/2002 | Chowanic et al. |
| 2003/0009280 A1 | 1/2003 | Hagebarth |
| 2003/0065442 A1 | 4/2003 | Touney |
| 2004/0207541 A1 | 10/2004 | Choi |
| 2005/0021227 A1 | 1/2005 | Matsumoto et al. |
| 2005/0027447 A1 * | 2/2005 | Hirose et al. .................. 701/210 |
| 2005/0055157 A1 | 3/2005 | Scholl |
| 2005/0149253 A1 | 7/2005 | Nambata |
| 2006/0015249 A1 | 1/2006 | Gieseke |
| 2006/0116818 A1 | 6/2006 | Chao et al. |
| 2007/0021905 A1 | 1/2007 | Takashima et al. |
| 2007/0073480 A1 | 3/2007 | Singh |
| 2008/0077314 A1 | 3/2008 | Ishikawa |
| 2008/0094250 A1 | 4/2008 | Myr |
| 2008/0103693 A1 | 5/2008 | Kato et al. |
| 2008/0125958 A1 | 5/2008 | Boss et al. |
| 2008/0288166 A1 * | 11/2008 | Onishi et al. .................. 701/209 |
| 2008/0294337 A1 | 11/2008 | Dawson et al. |
| 2009/0119009 A1 | 5/2009 | Dicke |
| 2009/0171577 A1 * | 7/2009 | Roumeliotis et al. ......... 701/209 |
| 2009/0210152 A1 * | 8/2009 | Kawa ............................ 701/208 |
| 2009/0254272 A1 | 10/2009 | Hendrey |
| 2010/0169007 A1 * | 7/2010 | Kaushik et al. ............... 701/208 |
| 2010/0228471 A1 | 9/2010 | Nagase |
| 2011/0295497 A1 * | 12/2011 | Abraham et al. ............. 701/200 |

FOREIGN PATENT DOCUMENTS

| | | | | |
|---|---|---|---|---|
| JP | 97227484 | * | 8/1997 | ............ G01C 21/00 |
| JP | 200375489 | * | 3/2003 | ............ G01C 21/00 |
| JP | 2004286455 A | * | 10/2004 | |

* cited by examiner

| ROUTE COMPARISON | MILES | TIME | FUEL |
|---|---|---|---|
| DIRECT | 21 mi | 35 min | 1 gal |
| ECO | 23 mi<br>+2 mi | 38 min<br>+3 min | 0.9 gal<br>-10% |
| FAST | 25 mi<br>+4 mi | 30 min<br>-5 min | 1.1 gal<br>+10% |

FIG. 9

SYSTEM AND METHOD FOR DISPLAYING A ROUTE BASED ON A VEHICLE STATE

BACKGROUND

The present invention relates generally to the field of navigation, and more particularly, to a system and method for displaying a route based on a vehicle state.

Currently, motor vehicles may include provisions for providing navigation information and driving directions to a driver. Some of these provisions can include a navigation system that is built into a motor vehicle. In some cases, these navigation systems may include a processor for calculating driving directions and a high capacity storage medium for storing the navigation information on the vehicle. In other cases, a navigation system may communicate with a remote server to receive driving directions and navigation information.

Navigation systems may include provisions for allowing the driver to indicate route preferences that are used by the navigation system or remote server when determining a route to a destination. Typically, these preferences may include whether the route should include carpool lanes, toll roads, and freeways, as well as other driver route preferences. The driver may select from one or more calculated routes to the destination that are determined based on the indicated route preferences.

There exists a need in the art for a system and method of displaying a route based on a vehicle state.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of displaying navigation information in a navigation system on a motor vehicle, comprising the steps of: receiving at least one route preference associated with determining a candidate route; receiving a ranking associated with a plurality of candidate routes; requesting navigation information associated with the plurality of candidate routes to a first destination; receiving a plurality of determined candidate routes to the first destination; detecting at least one vehicle operating condition; determining a vehicle state associated with the detected vehicle operating condition; displaying the determined candidate routes in a preselected order determined by the received ranking; wherein all of the determined candidate routes are displayed on the display device when a first vehicle state is determined; and wherein only a first ranked determined candidate route is displayed on a display device of the motor vehicle when a second vehicle state is determined.

In another aspect, the invention provides a method of displaying a route on a display device of a navigation system in a motor vehicle, comprising the steps of: requesting navigation information associated with multiple candidate routes from a current location of a motor vehicle to a destination; receiving a ranking associated with the multiple candidate routes from a user; receiving the navigational information associated with the multiple candidate routes from a remote location; ordering the received multiple candidate routes in a preselected order according to the ranking, wherein a first ranked candidate route is ranked higher than a second ranked candidate route; receiving a signal associated with at least one vehicle condition from a sensor; determining a vehicle state based on the received signal; displaying the received multiple candidate routes on a display device associated with the navigation system in the preselected order; wherein when a first vehicle state is determined, the first ranked candidate route and the second ranked candidate route are displayed on the display device; and wherein when a second vehicle state is determined, the first ranked candidate route is displayed on the display device and any remaining candidate routes are not displayed on the display device.

In another aspect, the invention provides a navigation system for a motor vehicle, the system comprising: a communication system in communication with a remote location, the communication system receiving a plurality of candidate routes from a current location of the motor vehicle to a destination from the remote location; an input device, the input device receiving a ranking for each of the plurality of candidate routes; a display device, the display device displaying the plurality of candidate routes in a preselected order determined by the received ranking; at least one sensor associated with an operating condition of the motor vehicle; a central unit comprising a processor, the central unit in communication with the communication system, the input device, the display device, and the at least one sensor; wherein the central unit determines a vehicle state associated with a detected operating condition received from the at least one sensor; and wherein the display device includes a first view displaying all of the plurality of candidate routes when a first vehicle state is determined by the central unit; and wherein the display device includes a second view displaying only a first ranked candidate route when a second vehicle state is determined by the central unit.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 9 is a schematic view of an exemplary display of information associated with multiple routes;

DETAILED DESCRIPTION

Figure 1:
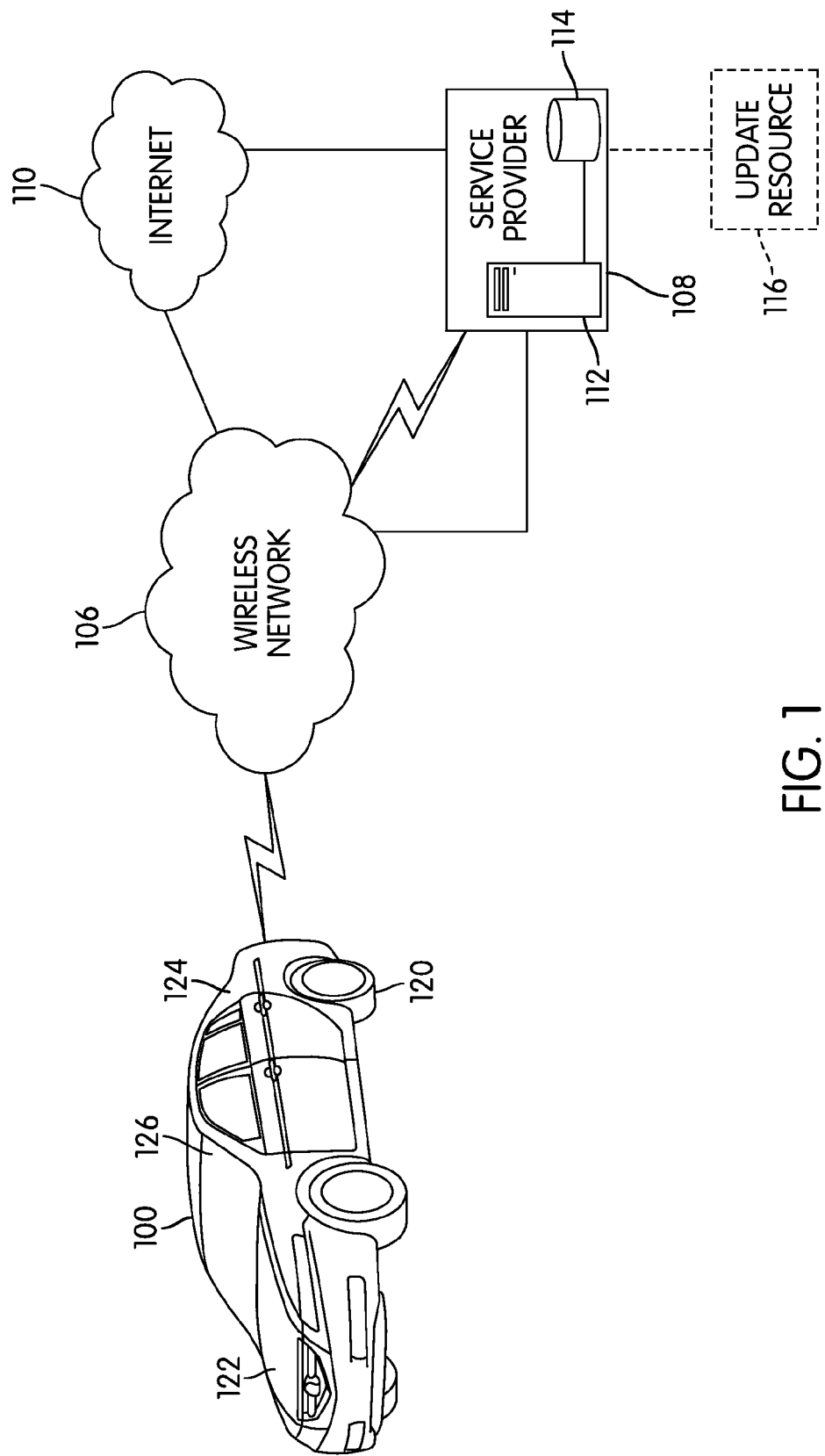
FIG. 1 is a schematic view of an exemplary embodiment of a motor vehicle in communication with a service provider.

FIG. 1 illustrates a schematic view of an exemplary embodiment of a motor vehicle 100 that is configured to communicate with a service provider 108. Motor vehicle 100 may include one or more components typically associated with a motor vehicle. In this embodiment, motor vehicle 100 includes at least one wheel 120 adapted to contact a road surface, an engine 122, a body or chassis 124 and a passenger cabin 126, which is adapted to accommodate at least one human passenger. In some embodiments, motor vehicle 100 may include various communications and computer resources adapted to communicate with service provider 108. In an exemplary embodiment, a wireless network 106 may be used facilitate communications between service provider 108 and motor vehicle 100. Wireless network 106 may be any kind of wireless network, including, but not limited to, any cellular telephone network using, for example, any one of the following standards: CDMA, TDMA, GSM, AMPS, PCS, analog, and/or W-CDMA.

Service provider 108 may communicate with wireless network 106 in a number of different ways. In some embodiments, service provider 108 communicates with wireless network 106 wirelessly. In other embodiments, service provider 108 may be directly connected to one or more elements of wireless network 106. In still other embodiments, service provider 108 may communicate with wireless network 106 by using the Internet 110. In some embodiments, service provider 108 may use more than one method of communicating with wireless network 106 or use other methods as back-ups.

In some embodiments, service provider 108 may include a computer system 112 and a database 114 in communication with computer system 112. The term "computer system" refers to the computing resources of a single computer, a portion of the computing resources of a single computer, and/or two or more computers in communication with one another, also any of these resources may be operated by one or more human users. In one embodiment, computer system 112 may include a server.

Computer system 112 may communicate with databases 114. Databases 114 may include any kind of storage device, including but not limited to: magnetic, optical, magneto-optical, and/or memory, including volatile memory and non-volatile memory. In some embodiments, database 114 may be integral with computer system 112. In other embodiments, database 114 may separate from computer system 112 and communicate with computer system 112.

Database 114 may comprise any number of databases. In some cases, database 114 may include a map database. In some embodiments, the map database may be used to store navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European). The term "GPS" is used to denote any global navigational satellite system. Navigation information may include one item of information, as well as a combination of several items of information.

In some embodiments, database 114 may include an energy database. In some embodiments, the energy database may be used to store an energy map. The term "energy map" as used throughout this detailed description and in the claims refers to any map, table, or other data structure that includes location based energy information. An energy map can provide information about the use or transformation of various types of energy as a motor vehicle travels on various roadways. An energy map is not limited to a particular type of energy and may include, but is not limited to: information about chemical energy, electrical energy, mechanical energy, nuclear energy as well as other types of energy. More specifically, an energy map can be configured to store energy information related to the use of various different power sources that could be used to power a motor vehicle. Examples of different power sources include, but are not limited to: rechargeable energy storage systems, electricity, electrochemical devices (including batteries), combustible fuels such as hydrocarbons, fuels configured for use in fuel cells, wind, natural gas, solar power, liquid nitrogen, compressed air as well as any other power sources or energy sources. Furthermore, these different power sources can be converted to different forms of energy using power plants such as combustion engines, electric motors, fuel cells, turbines, solar panels, as well as other power plants. In particular, in a motor vehicle, these power sources can be converted to mechanical and electrical energy using one or more power plants such as a combustion engine and/or an electric motor. In some cases, the term power source can be used to describe a power plant and its associated power source.

In some embodiments, the present system and method may include one or more databases, energy maps, systems and/or methods disclosed in any embodiment of either of the following copending and commonly owned applications: U.S. patent application Ser. No. 12/749,838, entitled "Minimum Energy Route For A Motor Vehicle", and filed on Mar. 30, 2010 and published as U.S. Patent Application Publication 2011/0246004 on Oct. 6, 2011, and U.S. patent application Ser. No. 12/749,856, entitled "Energy Maps And Method of Making", anel-filed on Mar. 30, 2010 and published as U.S.

Patent Application Publication 2011/0246019 on Oct. 6, 2011, both of which are incorporated by reference in their entirety.

In some embodiments, an update resource 116 may be in communication with service provider 108. Update resource 116 may provide updated information, including, but not limited to: updates, revisions, edits and other modifications, to service provider 108. In various embodiments, update resource 116 may provide updated information to one or more databases used by service provider 108. In some embodiments, update resource 116 may provide updated information for database 114. In an exemplary embodiment, update resource 116 may provide updated navigation information for a map database. In other embodiments, update resource 116 may provide updated energy map information for an energy database. In some embodiments, update resource 116 may provide automated updates. In other embodiments, update resource 116 may provide periodic updates. Update resource 116 is optional and may not be in communication with service provider 108 in some embodiments.

Figure 2:
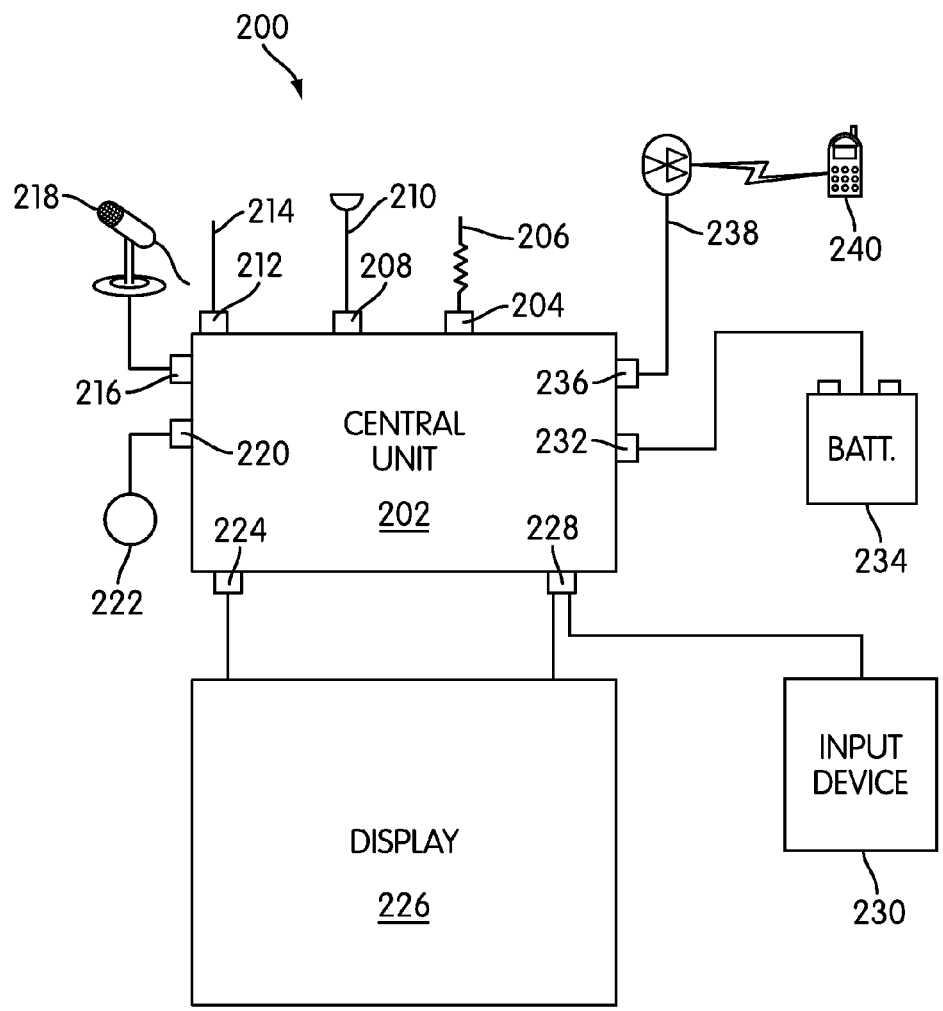
FIG. 2 is a schematic view of an exemplary embodiment of an on-board unit in a motor vehicle.

FIG. 2 is a schematic view of various elements or components of an on-board unit 200 that may be associated with motor vehicle 100. The term "on-board unit" (OBU) is used to refer to those elements or components that are associated with motor vehicle 100 for a particular embodiment. In some embodiments, OBU 200 may include provisions that permit OBU 200 to receive information. In some embodiments, OBU 200 may store information in a memory or computer readable media. In some embodiments, OBU 200 may include provisions that permit OBU 200 to process information. In some embodiments, OBU 200 may include provisions that permit OBU 200 to display information. In some embodiments, OBU 200 may include provisions that permit OBU 200 to receive information from a driver and/or user. A user may include a driver, a passenger, a remote user, and any other person accessing or any element or component associated with motor vehicle 100. In some embodiments, OBU 200 may include provisions that permit OBU 200 to interact with a driver and/or user. In some embodiments, OBU 200 may include provisions that permit OBU 200 to receive information from a wireless network. In various embodiments, OBU 200 may include a combination of two or more of the above provisions.

Different embodiments of OBU 200 may include different elements or components. In an exemplary embodiment, OBU 200 may include a central unit 202. Central unit 202 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with central unit 202 are optional. Some embodiments may include a given port or associated provision, while others may exclude it. The following description discloses many of the possible parts and provisions that may be used, however, it should be kept in mind that not every part or provision must be used in a given embodiment. Central unit 202 may include a wireless network antenna port 204 that is designed to receive information from a wireless network antenna 206, a GPS antenna port 208 designed to receive information from a GPS antenna 210, a radio antenna port 212 designed to receive information from a radio antenna 214.

In some embodiments, motor vehicle 100 may include one or more sensors for determining various operating conditions of motor vehicle 100 or for determining characteristics of an environment of motor vehicle 100. In some embodiments, motor vehicle 100 may include provisions for receiving GPS information. In some cases, motor vehicle 100 may include a GPS receiver for receiving GPS information from GPS antenna 210 via GPS antenna port 208. In an exemplary embodiment, a GPS receiver may be used for gathering GPS information for any systems of motor vehicle 100, including, but not limited to: GPS based navigation systems.

In one embodiment, motor vehicle 100 may include a vehicle speed sensor that is capable of determining the speed of motor vehicle 100. Generally, any type of vehicle speed sensor known in the art may be used. In addition, motor vehicle 100 may include an accelerometer that is configured to detect g forces, as well as other types of acceleration. In another embodiment, motor vehicle 100 may include a fuel or energy sensor that is configured to detect the amount of fuel or energy that is available to motor vehicle 100. Furthermore, motor vehicle 100 may include an altitude sensor for detecting the altitude of motor vehicle 100.

In some embodiments, motor vehicle 100 may include a passenger or occupant sensor to detect the presence of one or more persons in passenger cabin 126 of motor vehicle 100. In some cases, the passenger or occupant sensor may be a sensor disposed in a seat of motor vehicle 100 and configured to detect the presence of a passenger or occupant. In other cases, the passenger or occupant sensor may include other types of sensors, including, but not limited to a camera, infrared sensor, ultrasonic sensors, as well as any known type of sensor configured to detect the presence of a person in motor vehicle 100. In an exemplary embodiment, motor vehicle 100 may be configured to use one or more passenger or occupant sensors to automatically determine the number of occupants in passenger cabin 126 of motor vehicle 100. In other embodiments, motor vehicle 100 may include additional sensors or components for determining various operating conditions or vehicle states associated with motor vehicle 100 and/or for determining characteristics of an environment of motor vehicle 100.

Central unit 202 may also include a number of items that facilitate human interaction between a driver and/or user and OBU 200. To receive vocal information from a driver and/or user, central unit 202 may include a microphone port 216 that is capable of communicating with a microphone 218. Central unit 202 may also include an audio port 220 that is designed to send audio information to one or more speakers 222 or audio devices. In some embodiments, microphone port 216 and audio port 220 are conductors associated with a single physical connector. For example, microphone port 216 and audio port 220 may be female conductors of a multi-channel coaxial plug, like a standard 2.5 mm headset plug.

To provide visual information to a driver and/or user, central unit 202 may include a display port 224 that is capable of interacting with a display device 226. To receive input from a driver and/or user, central unit 202 may include an input port 228. Input port 228 may communicate with an input device 230. In some embodiments, display device 226 may also receive input from a driver and/or user. In some embodiments, display device 226 may include a touch screen that can receive input. In other embodiments, display device 226 may include a number of buttons that can receive input. In some embodiments, display device 226 may include both a touch screen and buttons. As shown in FIG. 2, user input received by display device 226 may also communicate with input port 228.

In some embodiments, a power port 232 may connect central unit 202, as well as other components of OBU 200, to a power supply 234. In the embodiment shown in FIG. 2, power supply 234 is a battery.

In some embodiments, central unit 202 may also include provisions to communicate with a wireless telephone 240. Wireless telephone 240 may include other wireless devices, including, but not limited to: a portable or tablet computer, a smart phone, or other portable device configured to access a wireless network. In different embodiments, any system may be used to facilitate this communication between central unit 202 and wireless telephone 240. In one embodiment, a low power radio frequency system may be used. In an exemplary embodiment, a wireless local or personal area network using the Bluetooth® protocol is used to facilitate communication with a wireless telephone. In the embodiment shown in FIG. 2, central unit 202 includes a local wireless network antenna port 236 that is configured to communicate with a local wireless network antenna 238, which in turn, is configured to communicate wirelessly with wireless telephone 240. In other embodiments, Referring to FIGS. 1 and 2, central unit 202 of OBU 200 may communicate with wireless network in various ways. In some embodiments, central unit 202 may include provisions that permit central unit 202 to act as a wireless telephone or device. In these embodiments, central unit 202 may communicate directly with wireless network 106 and may use wireless network antenna port 204 and wireless network antenna 206 to assist with this communication. In other embodiments, central unit 202 may communicate with wireless telephone 240, which in turn, communicates with wireless network 106. In these other embodiments, central unit 202 may use local wireless antenna port 236 and associated local wireless network antenna 238 to assist in facilitating communications with wireless telephone 240. One or both of these methods can be used by central unit 202 to communicate with wireless network 106.

In various embodiments, OBU 200 and central unit 202 may include additional elements and components. In some embodiments, OBU 200 and/or central unit 202 may also include memory, data storage provisions including one or more databases and/or one or more processors, as well as other ports for communicating with additional components or devices associated with motor vehicle 100.

In some embodiments, all or most of the components shown in FIG. 2 may be housed in a single case or unit. In other embodiments, the various components shown in FIG. 2 are not housed in a single physical case, but instead, are distributed throughout motor vehicle 100 and may communicate with one another via known wired or wireless methods. For example, in a system where one or more components communicate wirelessly, the Bluetooth® protocol may be used.

Figure 3:
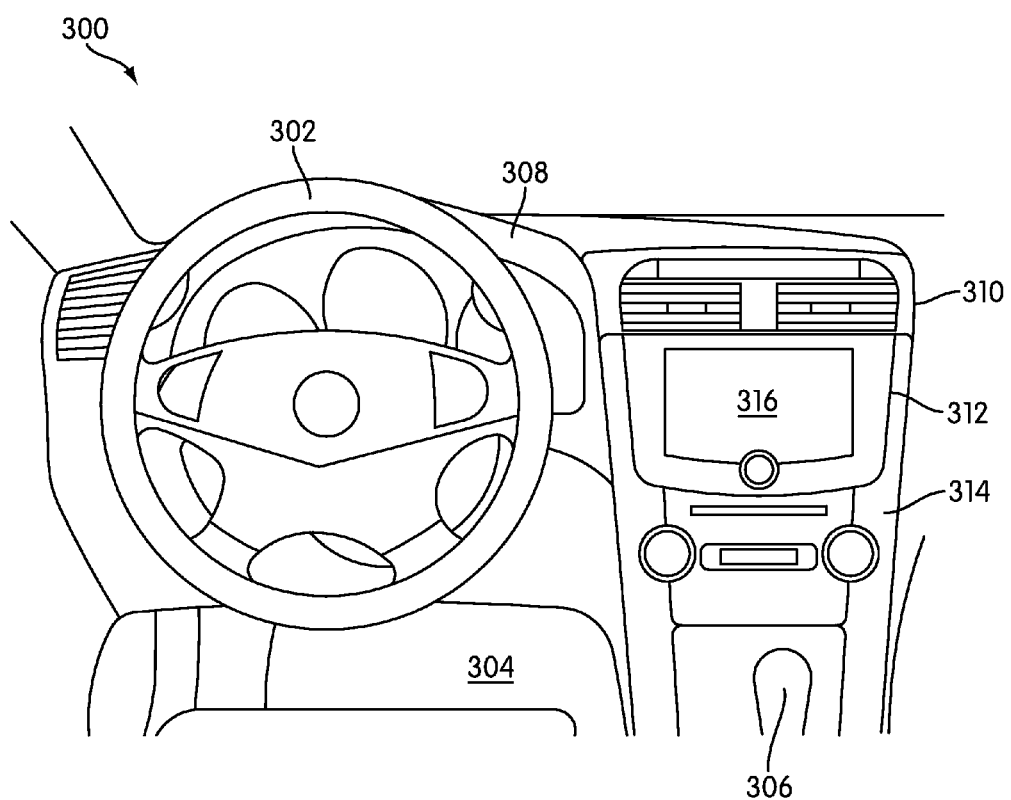
FIG. 3 is a schematic view of an interior compartment of a motor vehicle.

FIG. 3 is an exemplary embodiment of an interior 300 of passenger cabin 126 of motor vehicle 100. Interior 300 may include one or more components typically associated with a passenger cabin of a motor vehicle. In this embodiment, interior 300 may include a steering wheel 302, a driver's seat 304, a shifter or gear selector 306, a dashboard 308, and a center console 310. Center console 310 may include an upper portion 312 and a lower portion 314. In some embodiments, lower portion 314 may include a radio and/or audio controls. In an exemplary embodiment, upper portion 312 includes a display 316. In some embodiments, upper portion 312 includes a multi-function unit that may communicate or control an audio system, a climate control system and/or a navigation system.

In an exemplary embodiment, display 316 is used as display device 226, shown schematically in FIG. 2. Also in the exemplary embodiment, one or more components associated with OBU 200, including central unit 202, may be disposed in center console 310. In one embodiment, central unit 202 or portions of central unit 202 may disposed behind display 316. In some embodiments, display 316 may include a touch screen. Additionally, in some embodiments, buttons may be disposed next to display 316.

In one embodiment, central unit 202 may include provisions that allow central unit 202 to act as a hands free telephone system. In this regard, microphone 218 may be placed in a discreet and somewhat hidden location in passenger cabin 126 of motor vehicle 100. Other components of the hands free telephone system may be placed out of plain sight.

Figure 4:
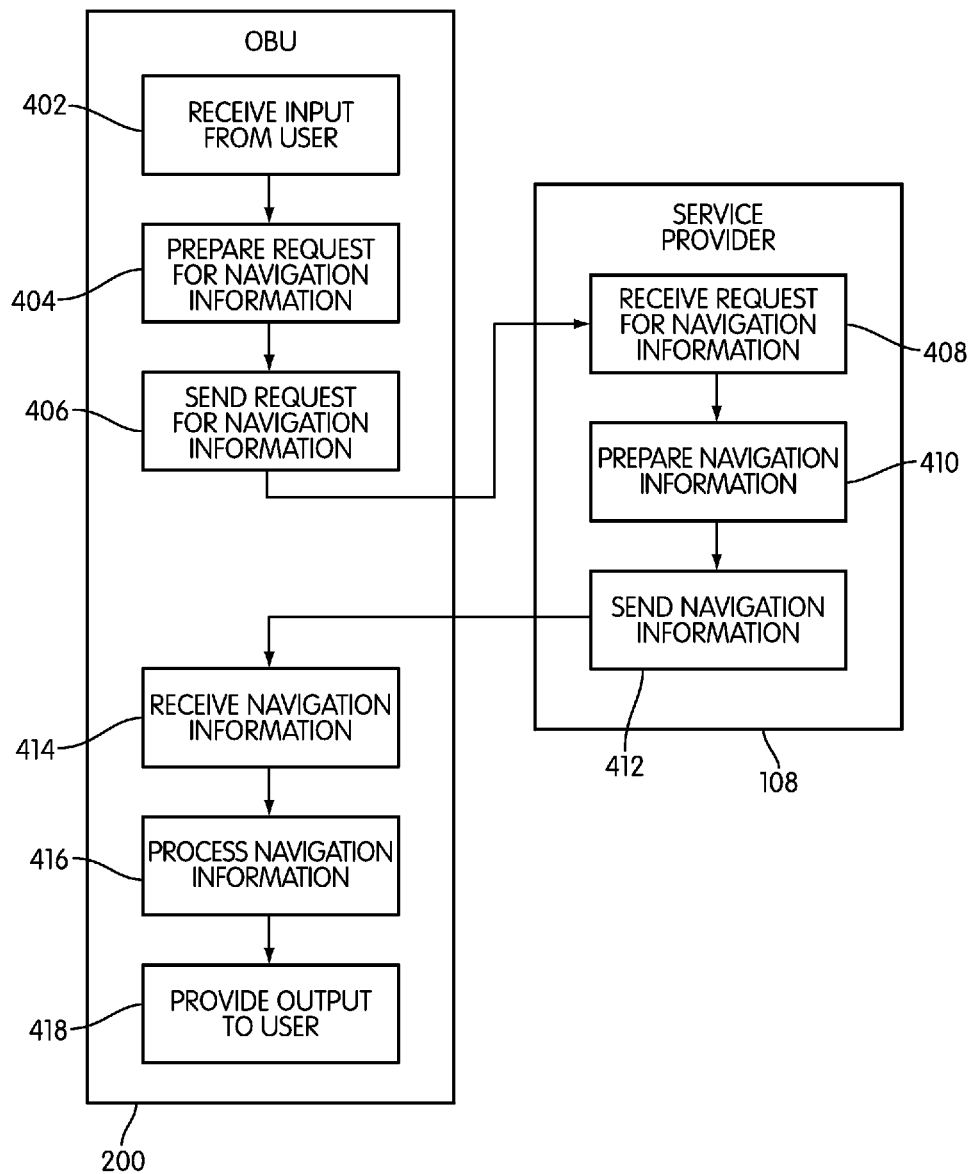
FIG. 4 is a flow diagram of an exemplary method of requesting and receiving navigation information.

Some embodiments provide a system and method managing navigation information. FIG. 4 is a flow diagram of a preferred embodiment of a system and method for managing navigation information.

In the embodiment shown in FIG. 4, certain steps may be associated with on-board unit (OBU) 200 and certain steps may be associated with service provider 108. Generally, those steps associated with OBU 200 are performed on or by OBU 200 and those steps associated with service provider 108 are performed on or by service provider 108. However, this is not necessarily the case, and those steps associated with OBU 200 may be performed on or by service provider 108 or some other resource, and those steps associated with service provider 108 may be performed on or by OBU 200 or some other resource. Additionally, the order of the steps illustrated in FIG. 4 is merely exemplary and it should be understood that the steps may be performed in any order.

In an exemplary embodiment, one or more steps associated with OBU 200 may be performed using processing facilities of central unit 202. In various embodiments, one or more steps associated with OBU 200 may be performed using one or more of the components shown in FIG. 2, including, but not limited to, central unit 202, display device 226, and/or input device 230. In an exemplary embodiment, one or more steps associated with service provider 108 may be performed using processing facilities of computer system 112. In various embodiments, one or more steps associated with service provider 108 may be performed using one or more of the components shown in FIG. 1, including, but not limited to, computer system 112, database 114, and/or update resource 116.

As shown in FIG. 4, the process begins when an input from a driver and/or user is received in step 402. Any form of input may be received in step 402. In some cases, the input may in the form of one or more buttons being pressed, and/or user interaction with a touch screen associated with display device 226. In other cases, a combination of input from buttons and/or touch screen interaction may be received.

In other embodiments, the input to be received in step 402 may be in the form of voice information. Any known speech recognition process or program may be utilized to convert spoken words, phrases and/or numbers into a machine readable format. In an exemplary embodiment, the IBM® embedded Via Voice speech recognition engine may used.

In step 404, OBU 200 may analyze and process the information received in step 402, and, in response, prepare a request for navigation information. In step 406, OBU 200 may send a request for navigation information. In step 408, service provider 108 may receive a request for navigation information. In step 410, service provider 108 may analyze and process the request for navigation information, and prepare a response to the request.

In some embodiments, service provider 108 may prepare navigation information for delivery. In an exemplary embodiment, this preparation step occurs in step 410 after a request for navigation information has been received. One or more different processes or techniques may be used to prepare navigation information for delivery as is known in the art. In some embodiments, service provider 108 may prepare navigation information for one or more route requests. Route requests may include a desired route from one location to a destination or multiple destinations. In some embodiments, service provider 108 may prepare multiple route requests that weigh or consider different factors when determining the route. For example, in some embodiments, a route may be prepared that optimizes or minimizes travel time. In other embodiments, a route may be prepared that optimizes or minimizes travel distance. In still other embodiments, a route may be prepared that optimizes or minimizes energy consumption.

In some embodiments, a route that optimizes or minimizes energy consumption may be prepared using the method and system disclosed in any of copending and commonly owned U.S. patent application Ser. No. 12/749,838, entitled "Minimum Energy Route For A Motor Vehicle", filed on Mar. 30, 2010 and published as U.S. Patent Application Publication 2011/0246004 on Oct. 6, 2011, and U.S. patent application Ser. No. 12/749,856, entitled "Energy Maps And Method of Making", filed on Mar. 30, 2010 and published as U.S. Patent Application Publication 2011/0246019 on Oct. 6, 2011, each of which is incorporated in its entirety herein by reference.

In step 412, service provider 108 may send the requested navigation information to OBU 200 of motor vehicle 100. Next, during step 414, OBU 200 may receive the navigation information. Following this, during step 416, OBU 200 may process the navigation information received from service provider 108. In some cases, this step may include processing or recalculating one or more portions of a route sent by service provider 108.

In step 418, OBU 200 may provide an output to the driver and/or user. In some embodiments, the output provided at step 418 may be navigation information output to a driver and/or user. In some cases, visual navigation information may present instructions to a driver and/or user on where to turn in the form of graphics or icons. In an exemplary embodiment, a route to a destination may be provided on display device 226. In another exemplary embodiment, multiple routes determined to optimize or minimize different factors, as discussed above, may be provided on display device 226. In other embodiments, multiple routes to one or more destinations may be provided on display device 226. In other cases, audible navigation information may be generated to instruct a driver and/or user where to turn. Audible information may be provided using speaker 222 and/or other audio devices associated with OBU 200. In still other cases, a combination of audio and visual instructions may be used to present navigation information to a driver and/or user.

Figure 5:
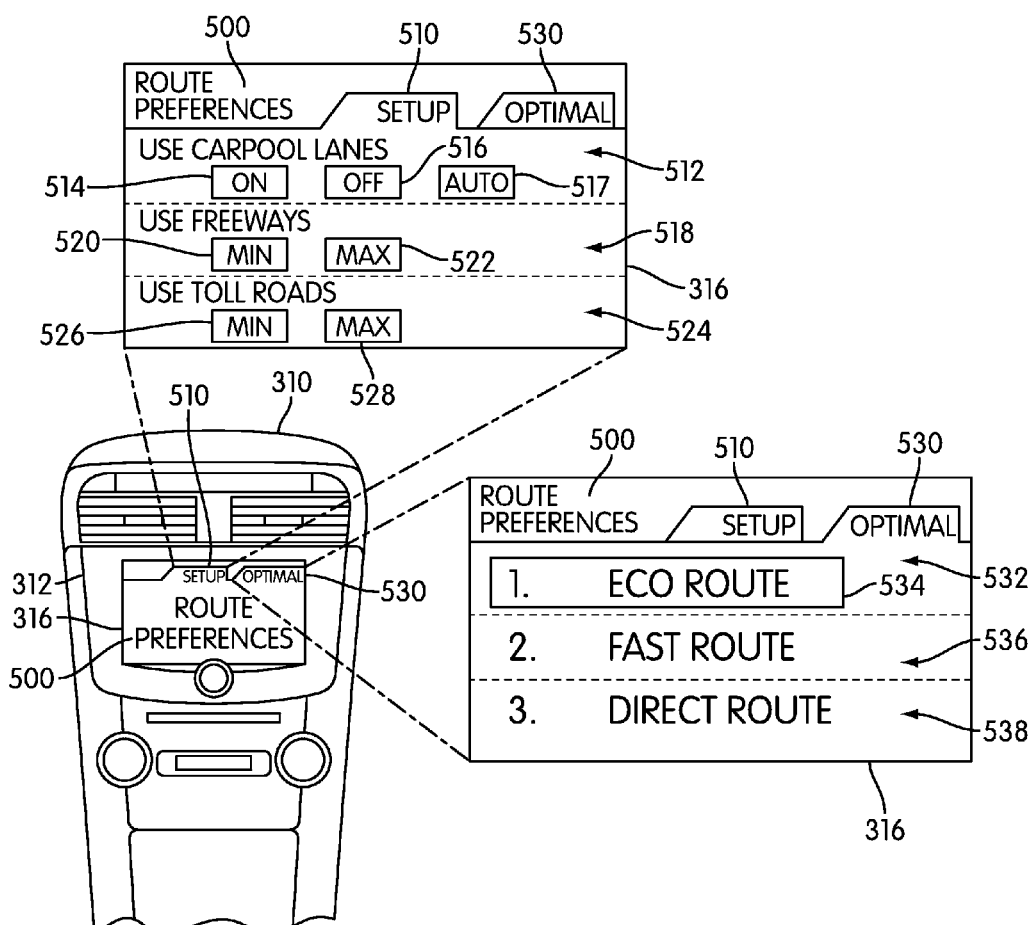
FIG. 5 is a schematic view of an exemplary embodiment of a route preference selection associated with a navigation system.

FIG. 5 is a schematic view of an exemplary embodiment of a route preference selection associated with a navigation system. In some embodiments, one or more components associated with a navigation system may be provided in interior 300 of motor vehicle 100. In this embodiment, center console 310 may include display 316 associated with a navigation system. In some embodiments, one or more driver and/or user route preferences 500 associated with determining a route from a location to a destination may be selected. In some embodiments, route preferences 500 may be considered by OBU 200 and/or service provider 108 when determining a route. In this embodiment, route preferences 500 may be entered by a driver and/or user using one or more input devices inside motor vehicle, including, but not limited to a touch screen associated with display 316, buttons, voice commands received via microphone 218, input device 230, and other forms of input, as well as any combination thereof. Additionally, in other embodiments, a driver and/or user may select route preferences 500 through Internet 110 and/or wireless network 106 from a remote location using a computer or portable device.

In some embodiments, route preferences 500 may include one or more factors to be considered when determining a candidate route to a destination. In some embodiments, route preferences 500 may include preferences related to types of roads or road characteristics. In other embodiments, route preferences 500 may include preferences related to weighing or considering different factors when determining the overall candidate route. In still other embodiments, route preferences 500 may include preferences related to output and/or display of a candidate route or navigation information. Generally, route preferences 500 may include any driver and/or user indicated preference related to the requested, received, and/or displayed navigation information.

In some embodiments, route preferences 500 related to type of roads or road characteristics may be associated with a setup tab 510 shown on display 316. In an exemplary embodiment, route preferences 500 associated with setup tab 510 may include whether or not to include carpool or HOV lanes, toll roads, and freeways in determining a candidate route to a destination. In one embodiment, setup tab 510 may include a selection 512 for a user to select whether or not to include carpool lanes in determining a candidate route. A driver and/or user may use an input device to choose an ON icon 514 or an OFF icon 516 for including carpool lanes in the candidate route. Additionally, in some embodiments, a user may select an AUTO icon 517 for automatically including carpool lanes in the candidate route when a passenger and/or occupant sensor detects the presence of passengers in the motor vehicle. Furthermore, in other embodiments, carpool lanes having specific numbers of required occupants may be automatically included in the candidate routes based on the number of occupants determined using one or more passenger or occupant sensors.

In this embodiment, a selection 518 may also be provided for a user to select, a MIN icon 520 or a MAX icon 522, for choosing, respectively, whether freeways should be minimized or maximized in determining a candidate route. Similarly, a selection 524 may also be provided for a user to select, a MIN icon 526 or a MAX icon 528, for choosing, respectively, whether toll roads should be minimized or maximized in determining a candidate route.

In other embodiments, additional route preferences 500 may be presented under setup tab 510, including, but not limited to: avoiding traffic lights, avoiding left turns, time of day restrictions or preferences, day of week preferences, as well as any other driver and/or user preference. Additionally, while in FIG. 5 route preferences 500 associated with setup tab 510 may be illustrated as "on" or "off" selections or "min" and "max" options, in other embodiments, various individual route preferences may be assigned different weights. In still other embodiments, weights assigned to individual route preferences may be varied by a driver and/or user, a navigation system, and/or a service provider.

In some embodiments, route preferences 500 related to weighing or considering different factors when determining the candidate route may be associated with an optimal tab 530 shown on display 316. In an exemplary embodiment, route preferences 500 associated with optimal tab 530 may include a preference for an eco route 532 that optimizes or minimizes energy consumption. In this embodiment, route preferences 500 associated with optimal tab 530 may also include a fast route 536 that optimizes or minimizes travel time and a direct route 538 that optimizes or minimizes travel distance. In an exemplary embodiment, route preferences 500 associated with optimal tab 530 may include rankings between various types of candidate routes. Rankings between the candidate routes may be used to determine a preselected order of the various types of candidate routes. In this embodiment, eco route 532 may be ranked by a driver and/or user above fast route 536 and direct route 538. With this arrangement, eco route 532 may be preselected as a preferred or first ranked candidate route when determining a candidate route to a destination. A driver and/or user may use an input device to change the order of the rankings indicated on display 316 with a selection box 534. In other embodiments, a driver and/or user may change the preselected order of the rankings using any input device or from a remote location.

In some embodiments, route preferences 500 associated with optimal tab 530 may determine the output of a route and/or navigation information to a driver and/or user. In an exemplary embodiment, OBU 200 may display one or more candidate routes on display 316 in a preselected order determined by the route preferences associated with optimal tab 530. In another embodiment, OBU 200 may display only the first ranked candidate route on display 316. In other embodiments, the candidate route rankings may be used by OBU 200 and/or service provider 108 to determine a preselected order for preparing navigation information for a route request. For example, in the embodiment shown in FIG. 5, eco route 532 may be prepared first, followed by fast route 536, and then direct route 538. With this arrangement, the highest ranked route may be prepared first to be ready for a driver and/or user to start traveling on the candidate route.

In some embodiments, output of a route and/or navigation information to a driver and/or user additionally may be based on a state of motor vehicle 100. A state of a motor vehicle may include one or more operating conditions and/or environmental characteristics of a motor vehicle. In an exemplary embodiment, motor vehicle 100 may display one or more candidate routes to a destination based on a vehicle state detected by one or more sensors determining operating conditions and/or environmental characteristics of motor vehicle 100, discussed above.

Figure 6:
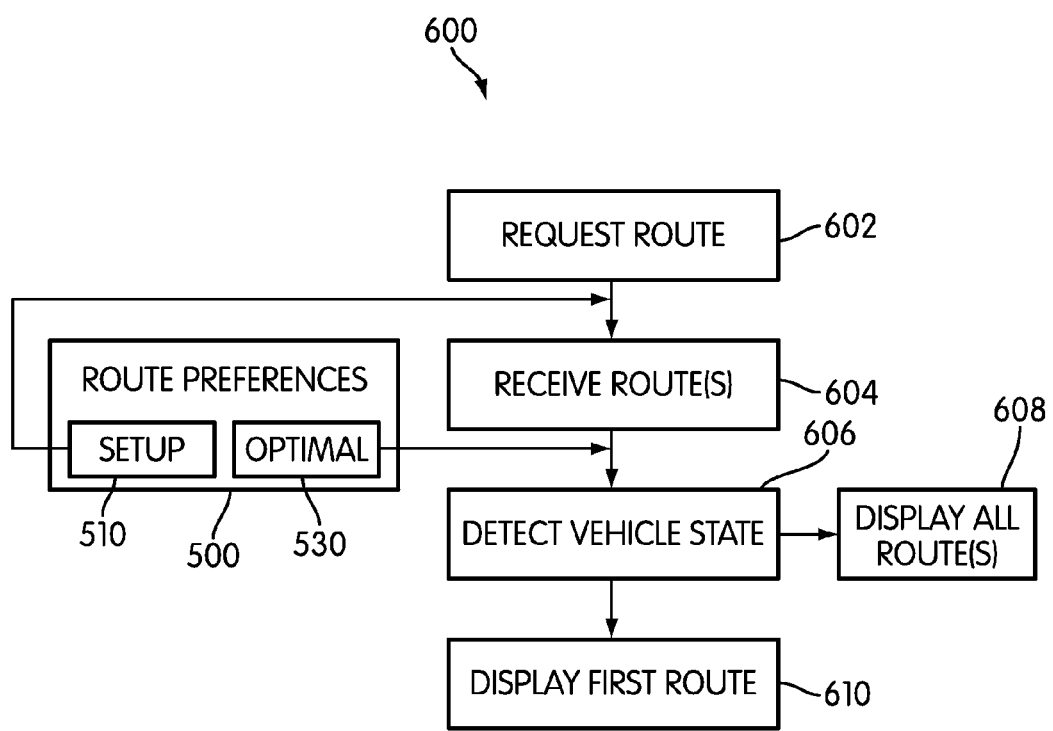
FIG. 6 is a flow diagram of an exemplary method of displaying an candidate route based on a vehicle state.

Referring now to FIG. 6, a flow diagram of an exemplary method 600 of displaying a candidate route based on a vehicle state is illustrated. In this embodiment, method 600 of displaying a candidate route may be based on one or more route preferences 500 and a vehicle state. It should be understood that the order of the steps illustrated in FIG. 6 is merely exemplary and it should be understood that the steps may be performed in any order.

At step 602, a request for a route to a destination is made at motor vehicle 100 using one or more communication devices, using wired and/or wireless networks, as discussed above. In some embodiments, a route request may include multiple candidate routes to one or more destinations. In some embodiments, the request at step 602 may include one or more route preferences 500. In this embodiment, route preferences 500 related to type of roads or road characteristics associated with setup tab 510 may be sent along with the route request at step 602. With this arrangement, these route preferences 500 may be used to determine the candidate route. Additionally, in some embodiments, route preferences 500 related to weighing or considering different factors when determining the candidate route associated with optimal tab 530 may be sent along with the route request at step 602. With this arrangement, these route preferences 500 may be used to determine one or more candidate routes.

In some embodiments, the route requested at step 602 may be determined by OBU 200 and/or service provider 108. In an exemplary embodiment, one or more candidate routes may be determined by service provider 108 and sent to motor vehicle 100 via wireless network 106, as discussed above. At step 604, motor vehicle 100 may receive one or more determined candidate routes. In an exemplary embodiment, route preferences 500 related to route rankings associated with optimal tab 530 may be applied to the candidate routes received at step 604. With this arrangement, the route rankings selected under optimal tab 530 may be used to determine the preselected order of one or more received candidate routes. In different embodiments, the route rakings may be applied at motor vehicle 100 or at service provider 108.

Next, at step 606, a vehicle state of motor vehicle 100 may be detected. In some embodiments, a vehicle state may detected by one or more sensors used for determining operating conditions and/or environmental characteristics of motor vehicle 100, discussed above. For example, a moving state and a stationary state of motor vehicle 100 may be determined by a GPS receiver, a vehicle speed sensor, and/or an accelerometer, a parked state or a driving state may be determined by a sensor associated with gear selector 306. Additional vehicle states may be associated with any operating condition and/or environmental characteristic associated with a motor vehicle and/or a driver or user.

In some embodiments, the detected vehicle state at step 606 may determine the output of the received candidate route and/or navigation information. In some embodiments, based on the vehicle state detected at step 606, one or more candidate routes may be displayed on display device 226 or display 316. In other embodiments, based on the vehicle state detected at step 606, one or more candidate routes may be output to a driver and/or user using audible or visual information, as discussed above. In an exemplary embodiment, if a first vehicle state is detected at step 606, then all of the received candidate routes may be displayed at step 608. Instead, if a second vehicle state, different from the first vehicle state, is detected at step 606, then only a single candidate route may be displayed at step 610. In one embodiment, the single candidate route displayed at step 610 may be the first ranked candidate route under the optimal tab 530 of route preferences 500.

Figure 7:
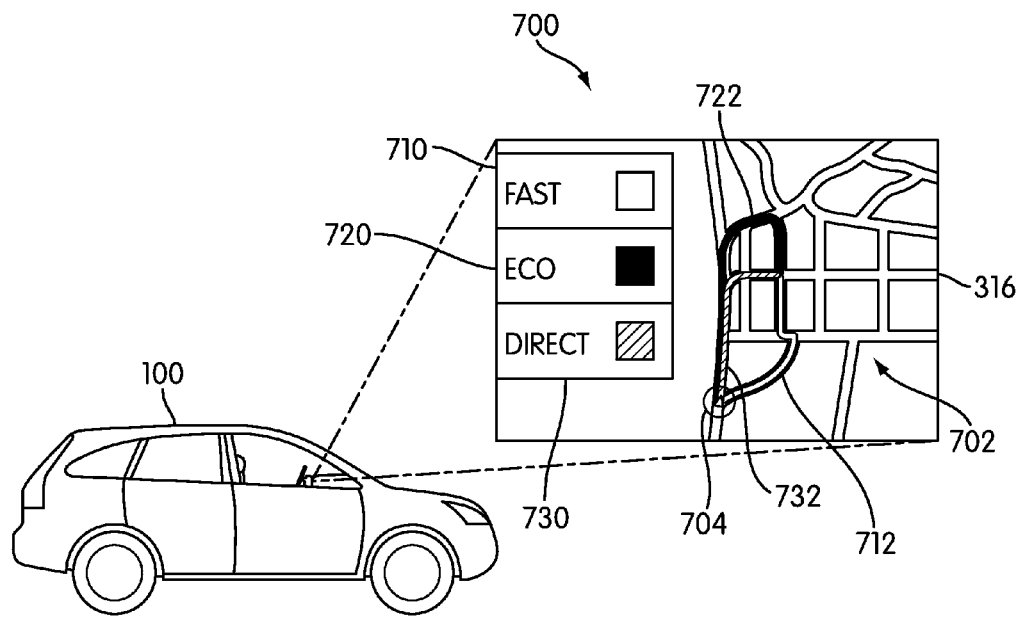
FIG. 7 is a representative view of a navigation system displaying a route.
Figure 8:
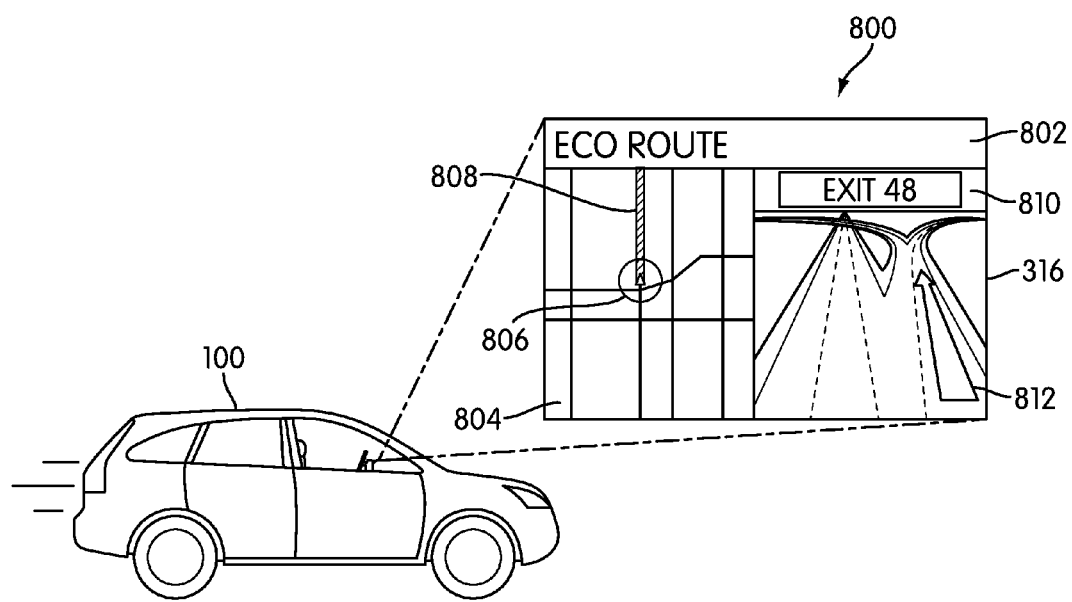
FIG. 8 is a representative view of a navigation system displaying a route.

FIGS. 7 and 8 illustrate two examples of displaying a candidate route based on different vehicle states. Referring now to FIG. 7, in this embodiment, motor vehicle 100 may be in a parked or stationary state. In an exemplary embodiment, display 316 of motor vehicle 100 may output a stopped view 700 associated with the parked or stationary vehicle state. In one embodiment, stopped view 700 may include multiple candidate routes to a destination. In some embodiments, a driver and/or user may then select one of the displayed multiple candidate routes to begin receiving navigation information directions to the destination. In this embodiment, stopped view 700 may include a map 702 on display 316 bearing indicia for each of the received candidate routes, including, but not limited to eco route 532, fast route 536, and direct route 538, discussed above. The present location and/or heading of motor vehicle 100 may be indicated on map 702 using a position icon 704.

As shown in FIG. 7, stopped view 700 may include map 702 bearing indicia, such as an icon or legend, for each candidate route, including a fast route icon 710, an eco route icon 720, and a direct route icon 730. Additionally, in this embodiment, each route may be graphically represented on display 316 overlaid on map 702, including fast route graphic 712, eco route graphic 722, and direct route graphic 732. In one embodiment, each of fast route graphic 712, eco route graphic 722, and direct route graphic 732 may be a different color to distinguish between the routes on display 316. In other embodiments, different indicia may be used to distinguish between one or more routes.

In an exemplary embodiment, the order of the displayed candidate routes may be determined based on the route rankings selected under optimal tab 530. With this arrangement, the routes displayed in stopped view 700 may indicate which candidate route has been selected as having the highest ranking by the driver and/or user. In some embodiments, the candidate route having the highest ranking may be indicated using a more distinctive or brighter color than the other routes. For example, in the present embodiment, eco route 532 has been ranked first under optimal tab 530. As a result, in stopped view 700, eco route graphic 722 displayed in map 702 may be associated with eco route icon 720 that is more distinctive than fast route icon 710 associated with fast route graphic 712 and direct route icon 730 associated with direct route graphic 732. In other embodiments, different methods of indicating ranking may be used, including, but not limited to varying size, shape, contrast, placement, order, as well as any other distinction.

Referring now to FIG. 8, in this embodiment, motor vehicle 100 may be in a moving or driving state. In an exemplary embodiment, display 316 of motor vehicle 100 may output a moving view 800 associated with the moving or driving vehicle state. In one embodiment, moving view 800 may include only a single candidate route to a destination. In this embodiment, moving view 800 may include a route header 802 on display 316 indicating the candidate route that is being displayed. Moving view 800 also may include a map 804 on display 316 bearing a position icon 806 for indicating the present location and/or heading of motor vehicle 100 on map 804 and route indicia 808 for the displayed candidate route.

In some embodiments, moving view 800 may further include a split screen on display 316 to show additional navigation information, for example, next exit icon 810 and/or next turn icon 812. It should be understood that route and/or navigation information display and output may be performed in any manner known in the art.

In an exemplary embodiment, the displayed candidate route in moving view 800 may be determined based on the route rankings selected under optimal tab 530. With this arrangement, the candidate route displayed in moving view 800 is the candidate route that has been selected as having the highest ranking by the driver and/or user. For example, in the present embodiment, eco route 532 has been ranked first under optimal tab 530. As a result, in moving view 800, route header 802 displays eco route and route indicia 808 associated with eco route 532 is displayed in map 804. With this arrangement, when motor vehicle 100 is moving, the first ranked candidate route is automatically displayed on display 316 without the need for a driver and/or user to select between multiple candidate routes to begin receiving navigation information directions to the destination.

In other embodiments, route preferences 500, including preferences associated with setup tab 510 and/or optimal tab 530 may be used to display or output different views to a driver and/or user based on other detected vehicle operating conditions and/or environmental characteristics associated with a vehicle state. For example, one or more candidate routes displayed on display 316 may be determined based on a vehicle state associated with an amount of fuel or energy available to motor vehicle 100 detected by a fuel or energy sensor. Other combinations of route preferences 500 and detected vehicle states may be used to determine the views and/or order of ranking of displayed candidate routes.

Figure 10:
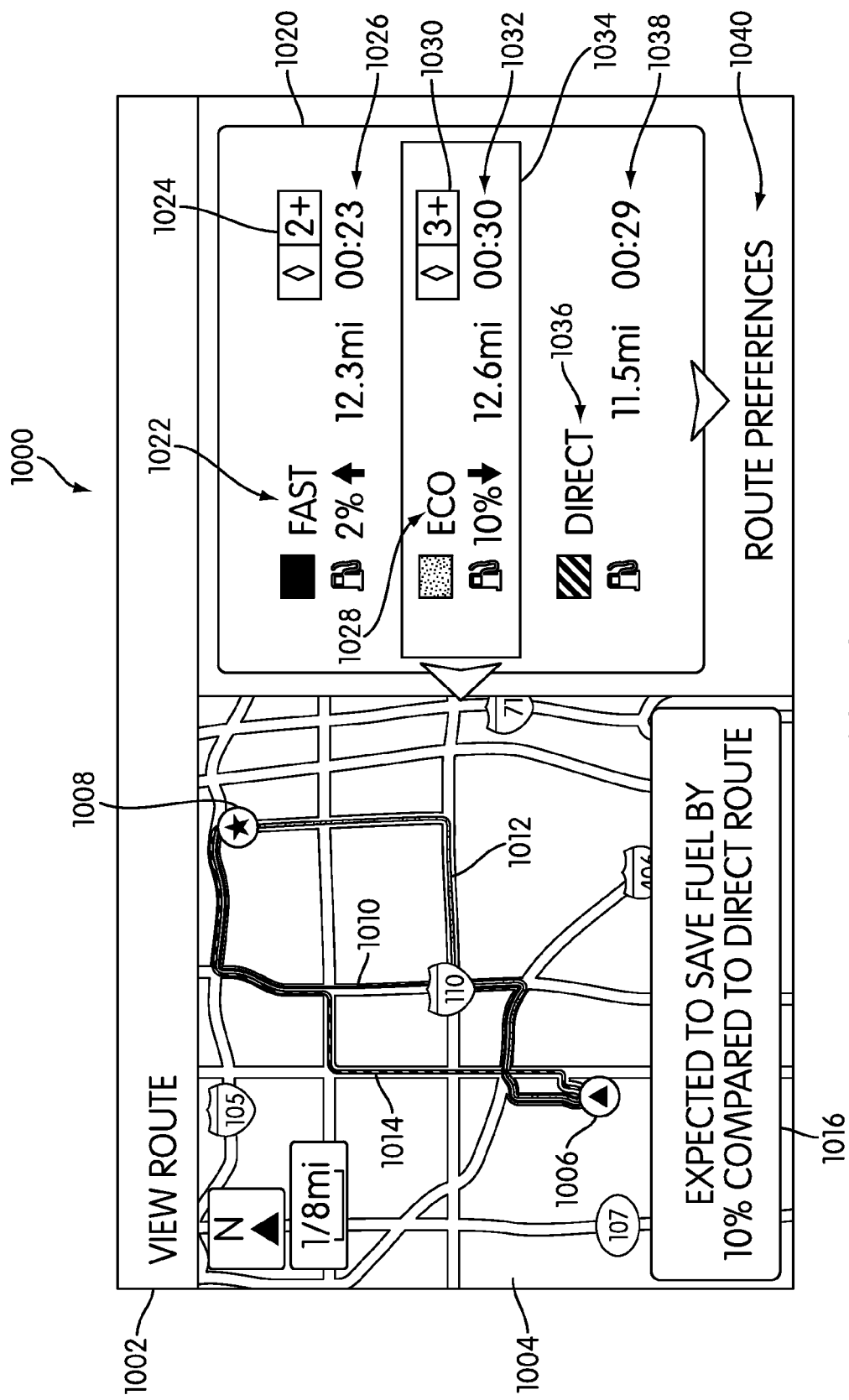
FIG. 10 is a schematic view of an alternate exemplary display of information associated with multiple routes.

In some embodiments, information associated with one or more candidate routes to a destination may be presented to a driver and/or user to aid in selecting one of the candidate routes. FIGS. 9 and 10 illustrate two exemplary embodiments of displaying information associated with one or more candidate routes to a driver. In the various embodiments, information may be presented to the driver in various ways, including in textual and/or graphic form, to assist the driver in selecting a route with the characteristics desired by the driver.

Referring now to FIG. 9, in some embodiments, a route comparison view 900 may be provided to a driver and/or user on display device 226. In this embodiment, an information header 902 indicates to a user that route comparison view 900 is selected. In route comparison view 900, information associated with one or more multiple candidate routes, including direct route 904, eco route 906, and/or fast route 908 may be displayed. In this embodiment, information that may be associated with the candidate routes may include a distance 910 in miles, a time 912 in minutes, and/or an amount of fuel 914 in gallons. In other embodiments, fuel 914 may include an amount of energy and/or a combination of fuel and energy. In still other embodiments, information associated with candidate routes may include other relevant information to aid a driver and/or user in choosing between routes. In addition, in some embodiments, route comparison view 900 provides the difference for each piece of displayed information between the first listed candidate route and the other candidate routes. For example, in this embodiment, route comparison view 900 displays the savings associated with each type of candidate route, including savings associated with fuel, miles, and/or time. In some embodiments, a driver and/or user may change the first listed candidate route using one or more input devices discussed above.

FIG. 10 illustrates an alternate embodiment of a route comparison view that may be provided to a driver and/or user. In one embodiment, route comparison view 1000 may be presented to a driver and/or user on display device 226. In this embodiment, route comparison view 1000 presents graphical and/or textual information associated with one or more candidate routes. In this embodiment, an information header 1002 indicates to a user that route comparison view 1000 is selected. In route comparison view 1000, information associated with one or more multiple candidate routes, including a fast route 1010, an eco route 1012, and/or a direct route 1014, may be displayed in a map portion 1004 of route comparison view 1000. In some embodiments, map portion 1004 may further include information associated with a current location of the motor vehicle and a destination. In one embodiment, map portion 1004 may include position icon 1006 to indicate the current location of the motor vehicle. Map portion 1004 may also include destination icon 1008 to indicate the destination for the candidate routes.

In some embodiments, route comparison view 1000 may include one or more savings messages that provide information to a user associated with the estimated or determined savings of one candidate route over another candidate route. In an exemplary embodiment, savings message 1016 may be displayed in route comparison view 1000 to indicate to a user that eco route 1012 is associated with a 10% savings of fuel compared with direct route 1014. In other embodiments, various savings messages may be provided, including information associated with savings in time, distance, as well as fuel or energy consumption between one or more candidate routes. In this embodiment, a selection indicator 1034 may be used to select one of the candidate routes. In some embodiments, a driver and/or user may move selection indicator 1034 to change the selected candidate route using one or more input devices discussed above.

As shown in FIG. 10, route comparison view 1000 may include additional textual and/or graphical information, such as an icon or legend, for each candidate route, in a route details portion 1020. In this embodiment, route details portion 1020 may include a fast route icon 1022, an eco route icon 1028, and a direct route icon 1036, which provide additional textual and/or graphical information associated with, respectively, fast route 1010, eco route 1012, and direct route 1014. In an exemplary embodiment, an HOV icon may provide information to a user indicating whether or not carpool lanes have been included in the calculation of the candidate route. In this embodiment, fast route icon 1022 is further associated with HOV icon 1024. Similarly, eco route icon 1028 is further associated with HOV icon 1030. In one embodiment, HOV icon 1024 and/or HOV icon 1030 may indicate to a user that carpool lanes were included in the calculation of fast route 1010 and/or eco route 1012.

In an exemplary embodiment, HOV icon 1024 and/or HOV icon 1030 may include a diamond-shaped icon associated with carpool lanes. In other embodiments, however, any indicia may be used to indicate the presence of carpool lanes in the candidate route. Additionally, in some embodiments, HOV icon 1024 and/or HOV icon 1030 may include a number associated with the specific number of required occupants associated with the carpool lanes included in the candidate route. For example, in FIG. 10, HOV icon 1024 includes a number "2+" that indicates that carpool lanes associated with fast route 1010 require two or more occupants in the motor vehicle. Similarly, HOV icon 1030 includes a number "3+" that indicates that carpool lanes associated with eco route 1012 require three or more occupants in the motor vehicle.

In some embodiments, additional information associated with each candidate route may further include a display of distance information, time information, and fuel and/or energy consumption savings information for each candidate route. In this embodiment, fast route details 1026 include the increase in fuel of fast route 1010 compared with direct route 1014, as well as the time and distance associated with fast route 1010. Similarly, eco route details 1032 include the fuel savings of eco route 1012 compared with direct route 1014, as well as the time and distance associated with eco route 1014. Further, in this embodiment, direct route details 1038 include the time and distance associated with direct route 1014. Additionally, in one embodiment, each of fast route icon 1022, eco route icon 1028, and direct route icon 1036 may be associated with a different color corresponding to the colors associated with fast route 1010, eco route 1012, and direct route 1014 shown on map portion 1004 to easily distinguish between the candidate routes on the display. In other embodiments, different indicia may be used to distinguish between one or more routes.

Furthermore, in other embodiments, additional information associated with each candidate route may be included in route details portion 1020. In some cases, icons or other textual and/or graphical information associated with route preferences to include or avoid certain features in candidate routes, including, but not limited to: toll roads, ferry crossings, freeways, u-turns, as well as any other road characteristics, may be displayed in route details portion 1020. In some embodiments, a user may use an input device to select route preferences 1040 from route details portion 1020 to add, subtract, or modify any of the information displayed in route details portion 1020.

Figure 11:
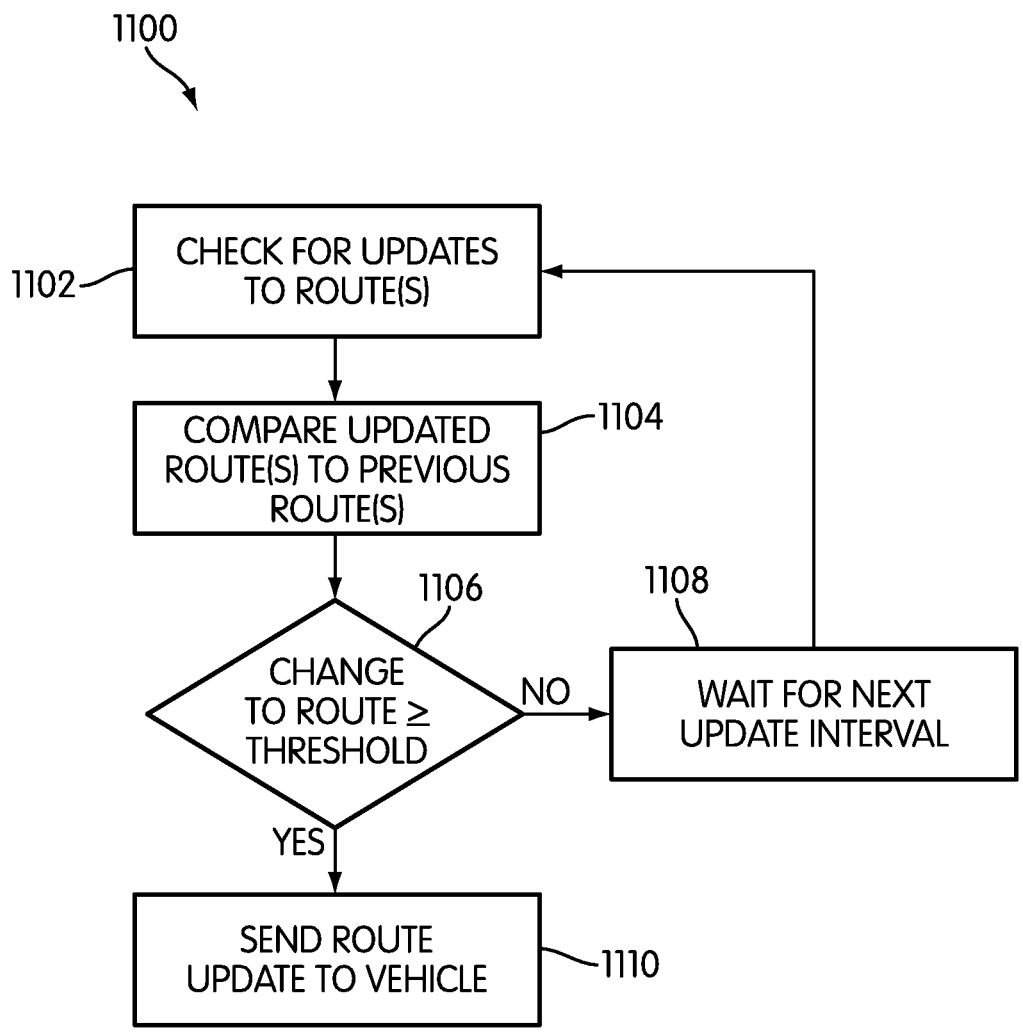
FIG. 11 is a flow diagram of an exemplary method of updating a route.

In some embodiments, updates to any one or more of the candidate routes received by motor vehicle 100 may be performed. Referring now to FIG. 11, a flow diagram of an exemplary method of updating a route is illustrated. In some cases, either or both of OBU 200 and/or service provider 108 may perform one or more steps of updating a route. In some embodiments, updates to routes may be provided by update resource 116. In some embodiments, a method 1100 of updating a route may begin at step 1102 by checking for updates to the route. In an exemplary embodiment, at step 1102, service provider 108 may periodically check for any updates to any of the already determined candidate routes that were sent to motor vehicle 100. Next, at step 1104, any updated routes may be compared to the previously determined candidate routes.

At step 1106, the method proceeds to determine whether any changes to the previously determined candidate routes determined at step 1104 exceed a threshold. Changes to the previously determined candidate routes may be changes in distance, time, fuel, as well as other factors associated with the route to the destination. In some embodiments, the threshold for changes to the previously determined candidate route may depend on the type of route and may be variable or fixed. For example, for a fast route, the threshold may be a change that is 10% or 10 minutes faster than the previously determined candidate route. Similarly, for an eco route, the threshold may be a change that is 10% or 0.1 gallon less than the previously determined candidate route. In other embodiments, the threshold value for the amount of change before an updated route is sent to motor vehicle 100 may be modified by service provider 108 or a user.

In the event that the change exceeds the threshold at step 1106, then at step 1110 the updated candidate route may be sent to motor vehicle 100. In some embodiments, the updated candidate route may be sent along with a message informing the driver and/or user of the benefit of the updated candidate route. Conversely, in the event that the change does not exceed the threshold at step 1106, then at step 1108, the process waits until the next update interval before starting again at step 1102.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of displaying navigation information in a navigation system on a motor vehicle, comprising the steps of:

receiving at least one route preference associated with determining a candidate route at a central unit associated with the navigation system disposed on-board the motor vehicle;

receiving a ranking associated with a plurality of candidate routes at the central unit;

requesting, by the central unit, navigation information associated with the plurality of candidate routes to a first destination;

receiving a plurality of determined candidate routes to the first destination routes at the central unit;

detecting at least one vehicle operating condition of the motor vehicle by one or more sensors disposed in the motor vehicle;

the central unit further performing the steps of:

determining a vehicle state associated with the detected vehicle operating condition, wherein the vehicle state is one of a moving state and a stationary state of the motor vehicle;

displaying the determined candidate routes in a preselected order determined by the received ranking on a display device disposed in the motor vehicle;

displaying a different number of the candidate routes on the display device based on the determined vehicle state;

wherein, upon determination of a first vehicle state associated with the stationary state by the central unit, all of the received plurality of determined candidate routes are displayed on the display device, and wherein the method further comprises receiving a selection of one of the received plurality of determined candidate routes displayed on the display device and displaying navigation information to the first destination associated with the selected one of the determined candidate routes on the display device; and wherein, upon determination of a second vehicle state associated with the moving state by the central unit, only a first ranked determined candidate route is displayed on the display device, and wherein the method further comprises automatically displaying only navigation information to the first destination associated with the first ranked determined candidate route on the display device without any selection by a user.

2. The method according to claim 1, wherein the at least one route preference includes a preference that optimizes or minimizes energy consumption.

3. The method according to claim 1, wherein the plurality of candidate routes include a first candidate route that optimizes or minimizes energy consumption, a second candidate route that optimizes or minimizes travel time, and a third candidate route that optimizes or minimizes travel distance.

4. The method according to claim 1, wherein the step of detecting the at least one vehicle operating condition further includes receiving a signal associated with a speed of the motor vehicle from a sensor; and wherein the step of determining the vehicle state associated with the detected vehicle operating condition further includes determining whether the motor vehicle is moving or stopped.

5. The method according to claim 1, wherein the detected at least one vehicle operating condition of the motor vehicle includes receiving a signal from a sensor associated with a gear selector.

6. The method according to claim 5, wherein the stationary state of the motor vehicle is determined when the sensor associated with the gear selector indicates that the motor vehicle is in park; and wherein the moving state of the motor vehicle is determined when the sensor associated with the gear selector indicates that the motor vehicle is not in park.

7. A method of displaying a route on a display device of a navigation system in a motor vehicle, comprising the steps of:

requesting, from a central unit associated with the navigation system disposed on-board the motor vehicle, navigation information associated with multiple candidate routes from a current location of a motor vehicle to a destination;

receiving a ranking associated with the multiple candidate routes from a user at the central unit;

receiving the navigational information associated with the multiple candidate routes from a remote location by the central unit;

ordering, by the central unit, the received multiple candidate routes in a preselected order according to the ranking, wherein a first ranked candidate route is ranked higher than a second ranked candidate route;

receiving a signal associated with at least one vehicle condition of the motor vehicle from a sensor at the central unit;

the central unit further performing the steps of:

determining a vehicle state based on the received signal, wherein the vehicle state is one of a moving state and a stationary state of the motor vehicle;

displaying the received multiple candidate routes on a display device associated with the navigation system in the preselected order;

displaying a different number of the received candidate routes on the display device based on the determined vehicle state;

wherein when a first vehicle state associated with the stationary state of the motor vehicle is determined by the central unit, the first ranked candidate route and the second ranked candidate route are displayed on the display device, and wherein navigation information according to one of the first ranked candidate route and the second ranked candidate route is displayed upon selection of either the first ranked candidate route or the second ranked candidate route; and wherein when a second vehicle state associated with the moving state of the motor vehicle is determined by the central unit, navigation information according to the first ranked candidate route is automatically displayed on the display device without any selection of a candidate route by a user of the motor vehicle, and any remaining candidate routes are not displayed on the display device.

8. The method according to claim 7, wherein the step of displaying the received multiple candidate routes further includes displaying a higher ranked candidate route with a more distinctive indicia than a lower ranked candidate route.

9. The method according to claim 7, wherein the at least one vehicle condition comprises at least one of a vehicle operating condition and an environmental characteristic of the motor vehicle.

10. The method according to claim 7, further comprising:

displaying a route comparison on the display device, wherein the route comparison includes a display of the difference between information associated with two or more of the candidate routes.

11. The method according to claim 7, wherein the signal associated with at least one vehicle condition of the motor vehicle is received from a sensor associated with a gear selector; and wherein the stationary state of the motor vehicle is determined when the signal from the sensor associated with the gear selector indicates that the vehicle is in a parked condition and the moving state of the motor vehicle is determined when the signal from the sensor associated with the gear selector indicates that the vehicle is in a driving condition.

12. The method according to claim 7, further comprising:

receiving an updated candidate route at the motor vehicle; wherein the updated candidate route includes changes to the determined candidate route that exceed a threshold.

13. The method according to claim 7, further comprising:

displaying a savings message on the display device, the savings message comprising a message that informs a user of the difference between information associated with at least two of the multiple candidate routes.

14. The method according to claim 13, wherein the savings message indicates the difference between at least one of energy consumption, travel time, and travel distance associated with at least two of the multiple candidate routes.

15. The method according to claim 7, further comprising: displaying an HOV icon associated with any of the multiple candidate routes that include at least one carpool lane.

16. The method according to claim 15, wherein the HOV icon includes a required number of occupants for the at least one carpool lane.

17. A navigation system for a motor vehicle, the system comprising:
   a communication system in communication with a remote location, the communication system receiving a plurality of candidate routes from a current location of the motor vehicle to a destination from the remote location;
   an input device, the input device receiving a ranking for each of the plurality of candidate routes;
   a display device, the display device displaying the plurality of candidate routes in a preselected order determined by the received ranking;
   at least one sensor associated with an operating condition of the motor vehicle;
   a central unit comprising a processor, the central unit in communication with the communication system, the input device, the display device, and the at least one sensor;
   wherein the central unit determines a vehicle state associated with a detected operating condition received from the at least one sensor, wherein the vehicle state is one of a moving state and a stationary state of the motor vehicle;
   wherein the central unit is configured to display a different number of candidate routes on the display device based on the determined vehicle state;
   wherein the display device includes a first view displaying all of the plurality of candidate routes when a first vehicle state associated with the stationary state of the motor vehicle is determined by the central unit, and wherein directions to the destination according to one of the plurality of candidate routes are displayed on the display device only upon selection of one of the plurality of candidate routes; and
   wherein the display device includes a second view displaying only a first ranked candidate route when a second vehicle state associated with the moving state of the motor vehicle is determined by the central unit, and wherein directions to the destination according to the first ranked candidate route are automatically displayed on the display device without a selection by a user.

18. The system according to claim 17, wherein the plurality of candidate routes include a first candidate route that optimizes or minimizes energy consumption, a second candidate route that optimizes or minimizes travel time, and a third candidate route that optimizes or minimizes travel distance.

19. The system according to claim 17, wherein the at least one sensor is a vehicle speed sensor and the operating condition is a speed of the motor vehicle; and wherein the central unit determines whether the motor vehicle is moving or stopped based on the speed of the motor vehicle.

20. The system according to claim 17, wherein the at least one sensor associated with an operating condition of the motor vehicle comprises a gear selector sensor; and
   wherein a status of the gear selector sensor determines the vehicle state.

21. The system according to claim 17, wherein the display device displays a route comparison view, the route comparison view comprising a display of the difference between information associated with two or more of the plurality of candidate routes.

22. The system according to claim 17, wherein the first view includes a higher ranked candidate route having a more distinctive indicia than a lower ranked candidate route.

23. The system according to claim 17, wherein the display device displays a savings message, the savings message comprising the difference between information associated with at least two of the plurality of candidate routes.

24. The system according to claim 23, wherein the savings message indicates the difference between at least one of energy consumption, travel time, and travel distance associated with at least two of the plurality of candidate routes.

25. The system according to claim 17, wherein the display device displays an HOV icon associated with any of the plurality of candidate routes that include at least one carpool lane.

26. The system according to claim 25, wherein the HOV icon includes a required number of occupants for the at least one carpool lane.

* * * * *